United States Patent
Connor et al.

(10) Patent No.: US 11,880,501 B2
(45) Date of Patent: *Jan. 23, 2024

(54) USER PROFILE GENERATING SYSTEM AND METHOD

(71) Applicant: Sony Interactive Entertainment Inc., Tokyo (JP)

(72) Inventors: Patrick John Connor, London (GB); Richard James Forster, London (GB); Andrew William Walker, London (GB); Matthew William Sanders, London (GB); Jessica Rose Grant, London (GB); Hans-Werner Gellersen, Lancaster (GB); Ludwig Sidenmark, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/272,425

(22) PCT Filed: Aug. 30, 2019

(86) PCT No.: PCT/GB2019/052436
§ 371 (c)(1),
(2) Date: Mar. 1, 2021

(87) PCT Pub. No.: WO2020/049282
PCT Pub. Date: Mar. 12, 2020

(65) Prior Publication Data
US 2021/0318751 A1   Oct. 14, 2021

(30) Foreign Application Priority Data
Sep. 6, 2018 (GB) .................................. 1814516

(51) Int. Cl.
*G06F 3/01* (2006.01)

(52) U.S. Cl.
CPC .............. *G06F 3/012* (2013.01); *G06F 3/013* (2013.01)

(58) Field of Classification Search
CPC ........ G06F 3/0346; G06F 3/017; G06F 3/013; G06F 3/012; G06F 3/011; G06T 19/006; H04N 13/366
See application file for complete search history.

(56) References Cited

U.S. PATENT DOCUMENTS

| | | | |
|---|---|---|---|
| 8,834,394 B2 * | 9/2014 | Ghajar | A61F 5/055 602/18 |
| 10,971,115 B2 * | 4/2021 | Sanders | G06F 3/147 |

(Continued)

FOREIGN PATENT DOCUMENTS

WO    2020049282 A1    3/2020

OTHER PUBLICATIONS

International Search Report and Written Opinion for corresponding PCT Application No. PCT/GB2019/052436, 13 pages, dated Nov. 11, 2019.

(Continued)

*Primary Examiner* — William Lu
(74) *Attorney, Agent, or Firm* — Matthew B. Dernier, Esq.

(57) ABSTRACT

A user profile generating system for generating a user profile for use with a processing device operable to display content includes: a head motion tracking unit operable to identify head motion of the user, an eye motion tracking unit operable to identify eye motion of the user, and a profile generating unit operable to generate a user profile comprising head tracking and eye tracking information for the user, where the generated user profile is used to modify interactions between the user and a processing device.

12 Claims, 7 Drawing Sheets

(56) References Cited

U.S. PATENT DOCUMENTS

| | | | |
|---|---|---|---|
| 11,016,562 B2* | 5/2021 | Walker | G06F 3/012 |
| 2006/0270945 A1* | 11/2006 | Ghajar | A61B 5/162 |
| | | | 600/558 |
| 2008/0206727 A1* | 8/2008 | Ghajar | A61B 5/162 |
| | | | 434/258 |
| 2010/0238262 A1* | 9/2010 | Kurtz | H04N 7/142 |
| | | | 348/14.01 |
| 2010/0328492 A1* | 12/2010 | Fedorovskaya | G06Q 30/02 |
| | | | 348/231.2 |
| 2011/0267374 A1* | 11/2011 | Sakata | H04N 21/4882 |
| | | | 345/672 |
| 2012/0131460 A1* | 5/2012 | Coyle-Gilchrist | G11B 27/34 |
| | | | 715/716 |
| 2013/0083003 A1* | 4/2013 | Perez | G06T 11/20 |
| | | | 345/419 |
| 2014/0188009 A1* | 7/2014 | Lange | A61B 5/1127 |
| | | | 600/595 |
| 2014/0267420 A1* | 9/2014 | Schowengerdt | G06T 19/006 |
| | | | 345/633 |
| 2014/0358962 A1* | 12/2014 | Wantland | G06F 16/90335 |
| | | | 707/769 |
| 2014/0362201 A1* | 12/2014 | Nguyen | H04R 27/00 |
| | | | 348/78 |
| 2015/0113407 A1* | 4/2015 | Hoffert | G06F 16/743 |
| | | | 715/720 |
| 2015/0130703 A1* | 5/2015 | Ghajar | G06F 3/013 |
| | | | 345/156 |
| 2015/0156803 A1* | 6/2015 | Ballard | G06F 3/0485 |
| | | | 455/422.1 |
| 2015/0212576 A1* | 7/2015 | Ambrus | G06F 3/04842 |
| | | | 345/156 |
| 2015/0261318 A1* | 9/2015 | Scavezze | G06F 3/017 |
| | | | 345/158 |
| 2015/0338915 A1* | 11/2015 | Publicover | G06F 3/0304 |
| | | | 345/633 |
| 2016/0025981 A1* | 1/2016 | Burns | G02B 27/0101 |
| | | | 345/156 |
| 2016/0070344 A1* | 3/2016 | Gohl | G09G 5/377 |
| | | | 345/156 |
| 2016/0228771 A1* | 8/2016 | Watson | A61B 5/4023 |
| 2016/0307038 A1* | 10/2016 | Skogö | G06V 40/45 |
| 2017/0045941 A1* | 2/2017 | Tokubo | A63F 13/53 |
| 2017/0235360 A1* | 8/2017 | George-Svahn | G06F 3/03547 |
| | | | 345/173 |
| 2017/0354883 A1* | 12/2017 | Benedetto | G06T 11/60 |
| 2017/0358141 A1* | 12/2017 | Stafford | A63F 13/537 |
| 2018/0004285 A1* | 1/2018 | Castleman | H04L 65/602 |
| 2018/0007099 A1* | 1/2018 | Ein-Gil | H04L 67/16 |
| 2018/0146193 A1 | 5/2018 | Seafreed | |
| 2018/0275753 A1* | 9/2018 | Publicover | G06F 3/04812 |
| 2018/0348863 A1* | 12/2018 | Aimone | A61B 5/378 |
| 2019/0038964 A1* | 2/2019 | Veeramani | A63F 13/67 |
| 2019/0056856 A1* | 2/2019 | Simmons | G06F 3/0484 |
| 2019/0204913 A1* | 7/2019 | Sarkar | G06F 3/013 |
| 2019/0221191 A1* | 7/2019 | Chhipa | G09G 3/002 |
| 2020/0081526 A1* | 3/2020 | Walker | G06F 3/012 |
| 2020/0082794 A1* | 3/2020 | Sanders | G02B 27/0172 |

OTHER PUBLICATIONS

Combined Search and Examination Report for corresponding GB Application No. GB1814516.9, 9 pages, dated Feb. 28, 2019.
Examination Report for corresponding GB Application No. GB1814516. 9, 7 pages, dated Apr. 16, 2021.
Communication pursuant to Article 94(3), to corresponding EP Application No. 19763071.8, 4 pages, dated Aug. 2, 2022.
Communication pursuant to Article 94(3), to corresponding EP Application No. 19763071.8, 5 pages, dated Sep. 29, 2023.

* cited by examiner

300

300

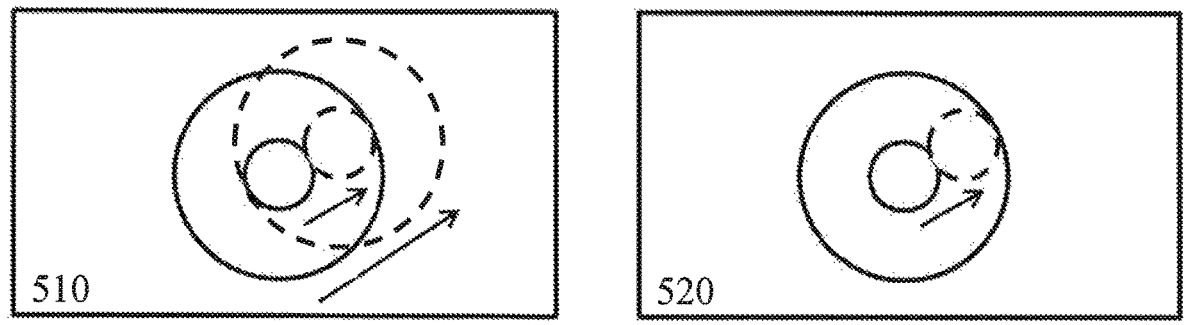
Figure 5
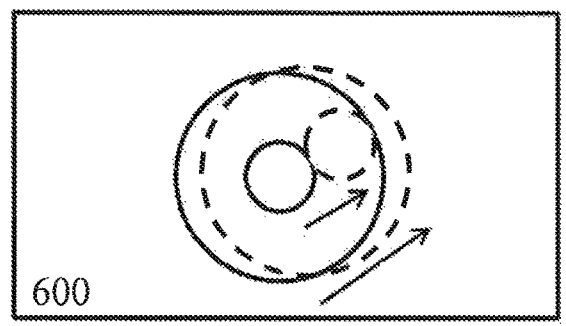
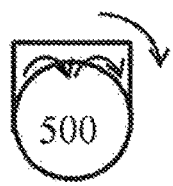
Figure 6

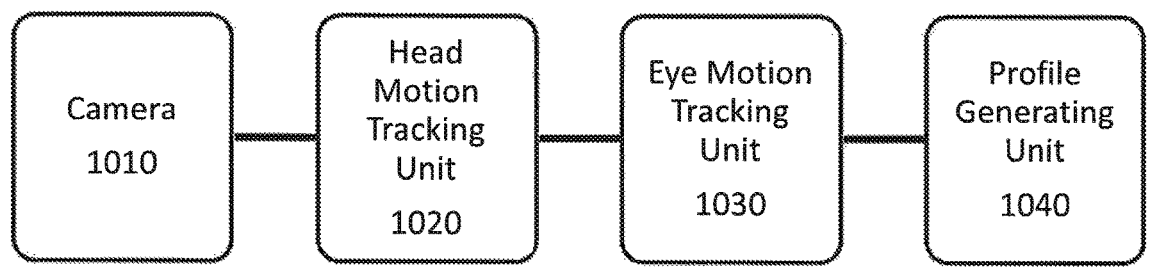
1000                            Figure 10
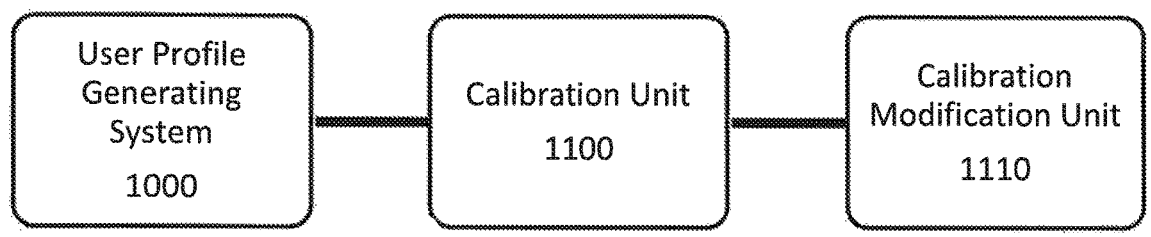
Figure 11
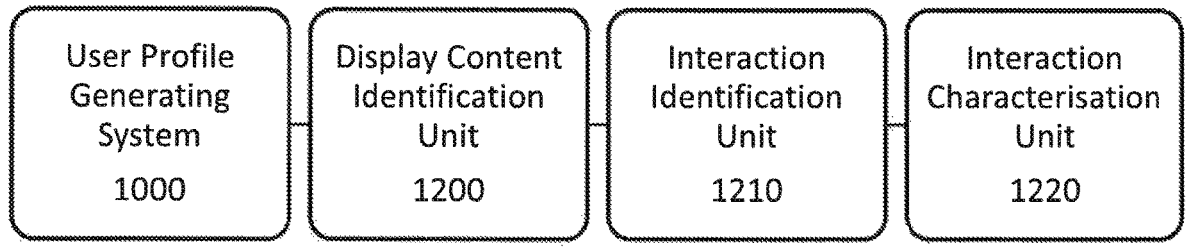
Figure 12

USER PROFILE GENERATING SYSTEM AND METHOD

BACKGROUND

This disclosure relates to a user profile generating system and method.

In recent years there has been a trend towards providing more natural inputs for users of processing devices, such as video consoles or computers. For example, motion sensing controllers may be provided that enable a user to use gestures to input commands rather than relying entirely on button presses. While considered to be an intuitive manner of inputting commands, in some cases this may not be desirable due to the cost or inconvenience associated with the use of dedicated input devices; this is particularly true when applications or hardware have dedicated hardware that cannot be used for other purposes, as users may wish to make use of a number of different applications or hardware arrangements.

Another example of such an input is that of tracking a user with one or more cameras; for example, tracking hand gestures, head motion or eye motion. The cameras may be associated with a games console or a computer, for example, or may be part of a standalone tracking system. Such methods may enable a user to interact with a system without the use of any peripherals, and as such may be considered to be natural and convenient input methods. However, these user-tracking methods may also have a number of potential drawbacks.

For instance, providing gesture-based inputs may require a user to position themselves in an area with a lot of room for movement, which may be inconvenient. Additionally, by having to move body parts the user may become tired or uncomfortable—particularly if the motion is frequent, repetitive, or unnatural to the user, or if they have limited mobility. Such problems may become more apparent when used in combination with a virtual reality (VR) arrangement in which a user views content on a head-mountable display (HMD); in this example use case, the user is unable to see obstacles in the real environment and may need to move more as the (potential) display area is increased (as the user is generally placed in a virtual environment that exists in every direction) relative to a fixed display such as a television.

SUMMARY

In view of this, it is considered desirable to provide a more comfortable user experience to enhance the user's enjoyment of interactive content. In particular, a system and method for providing an improved camera-based tracking and interaction may be desirable.

It is in the context of the above problems that the present invention arises.

Further respective aspects and features of the disclosure are defined in the appended claims.

BRIEF DESCRIPTION OF THE DRAWING

Embodiments of the present invention will now be described by way of example with reference to the accompanying drawings, in which:

FIG. 5 schematically illustrates examples of two different methods for performing a viewing transition;

FIG. 6 schematically illustrates a further viewing transition example;

FIG. 10 schematically illustrates a user profile generating system;

FIG. 11 schematically illustrates a calibration system;

FIG. 12 schematically illustrates an interaction characterisation system;

DETAILED DESCRIPTION

While the specification refers largely to arrangements in which an HMD is the display device used to display content to a user, the teachings provided may be equally applicable to more traditional arrangements in which a television (or other display) is used to present content to the user.

Figure 1:
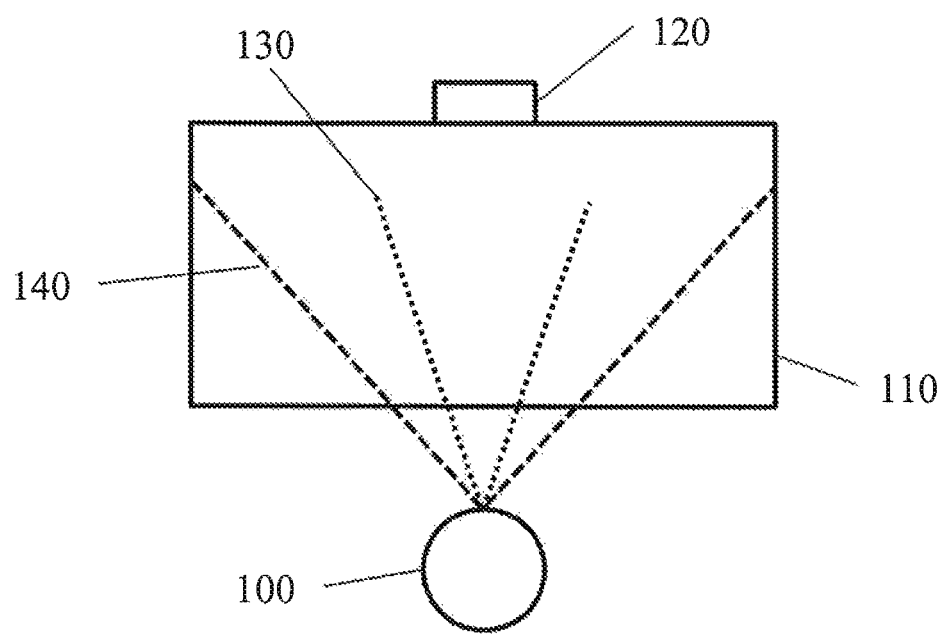
FIG. 1 schematically illustrates a content viewing arrangement.

FIG. 1 provides a schematic illustration of such an arrangement; as is apparent from this illustration, the user's gaze is directed towards only a portion of the display, and as a result the user is required to move their head in order to view other portions of the display.

In this Figure, the user 100 is viewing content presented on the display 110. A camera 120 is also shown on top of the display 110; the camera 120 may be used to track a user's motion (for example, eye, head or body motion). The cone 130 represents the viewing angle for the user 100 looking straight ahead, ignoring peripheral vision areas. The cone 130 may be moved either by the user 100 moving their eyes, head, or whole body (for example). The cone 140 represents the required viewing angle to view the whole of the display 110—as this is clearly larger than the cone 130, it is expected that the user will have to move their head and/or eyes in order to view the whole of the display 110.

Figure 2:
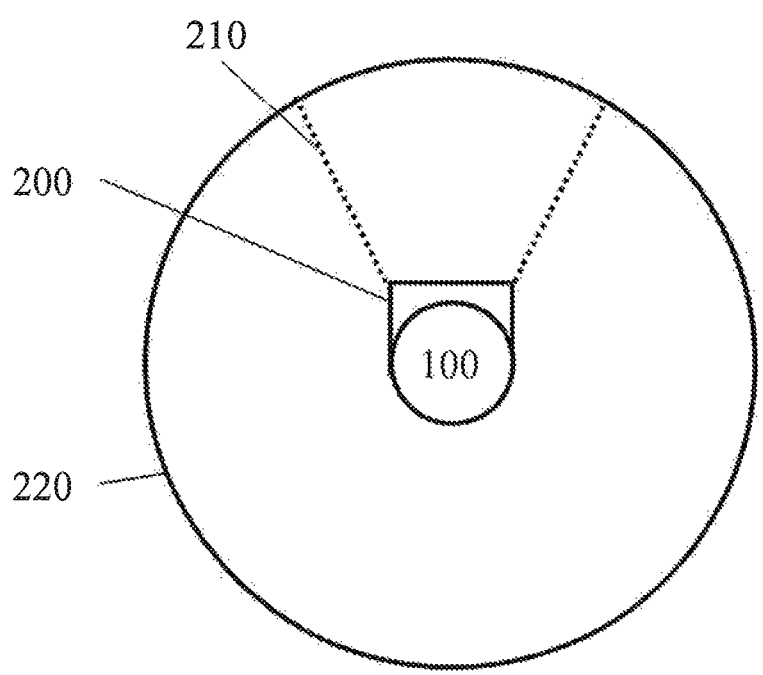
FIG. 2 schematically illustrates a second content viewing arrangement.

An alternative arrangement is shown in FIG. 2, which schematically illustrates a comparable arrangement in which a user 100 instead uses an HMD 200 as a display device. the user 100 is presented with a view corresponding the region 210 of the virtual environment 220. In this case, the user is able to view different areas of the region 210 using eye movement alone, while viewing areas outside of the virtual environment 220 of the region 210 may also require head motion.

In each of these arrangements it is necessary for users to move their head and/or their eyes in order to view all of the content that is displayed (and/or able to be displayed, in the case of the HMD). However, the use of head and/or eye motion for viewing content out of the user's immediate field of view may vary from person to person.

For example, some users may rely heavily on head motion and entirely forgo eye motion—whenever the user wishes to view something that is not directly in front of them, they move their head until the target is directly in front of them. Of course, such users may be rare and it is expected that at least some eye motion is used.

At the other end of the spectrum, there may be users that rely heavily on eye motion, such that head motion is only performed when it is physically impossible for the user to view content at the current head position.

It would be expected that most users would exist somewhere on the spectrum between these two extremes, such that different users may use different combinations of head and eye motion to acquire a desired view.

It is generally considered that eye motion is less demanding and more comfortable for a user than head motion, especially during extended viewing sessions. It may therefore be advantageous to tailor a user experience to take into account when a viewer will move their head and/or eyes; this may be of particular interest in view of interactive content, where head and/or eye motion may be used to provide inputs to the content.

In the present disclosure, it is considered advantageous that a user profile is generated that comprises information relating to the user's preferences regarding head and eye motion. Such a profile may be used to modify content to be displayed to a user, for example, or may be used to characterise a particular head motion-/eye motion-based interaction. Examples of the use of a user profile are discussed below.

Figure 3:
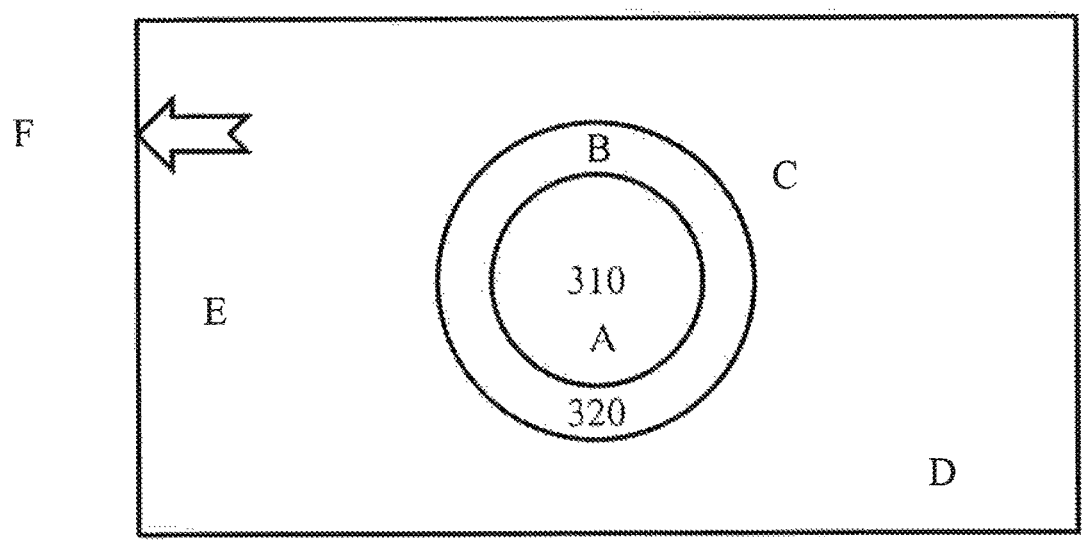
FIG. 3 schematically illustrates a calibration display.

FIG. 3 schematically illustrates a screen that may be displayed to a user during a calibration process for capturing information about head and/or eye motion. A display 300 (corresponding to a view provided by an HMD, for example, or a display screen such as a TV) is shown with concentric circles 310 and 320 that illustrate a user's focus area and a surrounding region of vision respectively.

A number of markers are also shown on the display 300, represented by letters A-E, and the user may be invited to look at each of them in turn. A further marker (F) is shown that is outside of the display 300, but may be viewable by a user changing the viewpoint that is displayed—depending on the arrangement, this may be performed by user input or head motion, for example. An example of a calibration process using this arrangement is provided below.

Firstly, a user is instructed to look at the letter A; as this is within the region 310 this is expected to result in little or no eye motion, and no head motion. The user may be invited to provide an input (such as a button press or spoken command) to indicate that they are looking at the letter A, or this may simply be identified using eye tracking data.

The user is then instructed to look at the letter B. As this is only slightly out of the central area 310 of the user's gaze, it is expected that most users will simply adjust their gaze upwards such that the region 310 is now centred on (or at least contains) the letter B. This would be expected to be performed Following this, the user may then be immediately directed towards the letter C, or may be instructed to return to marker A before progressing to viewing the letter C.

The letter C may not be visible to a user, or only visible in the user's peripheral vision. It would likely be uncomfortable for many users to view the letter C using eye motion alone. Viewing the letter C would therefore be expected to induce a head motion from most users.

The viewing of the letter D provides a similar effect to that of viewing the letter C, albeit more exaggerated. A larger head motion would be expected here that that associated with viewing the letter C, due to the increased distance between letters.

In a similar fashion, the viewing of the letter E would be expected to induce an even larger head motion from the user. When the user transitions between viewing letters with a larger separation, the combination of head and eye motion performed by the user may be identified. For example, a first user may move their head such that the letter appears in the centre of their vision—thereby performing head motion with no eye motion. A second user may move their head only far enough to enable the user to perform their maximum comfortable eye motion in order to view the letter. Other users may perform combinations of head/eye motion that lie between these two, and this may be identified through a number of different transitions being induced by the calibration process.

The final letter, F, that is shown is outside of the display area 300. An arrow is provided that indicates to the user where the letter F may be found—the user should then either provide controller inputs or rotate their head/body sufficiently to cause the letter F to enter the display area 300.

By instructing the user to perform a number of viewpoint changes of different magnitudes and directions, a profile may be generated. For example, the largest distance between markers that a user will view without performing any head motion may be identified. The combinations of head motion, user input, and eye motion used to view a marker a particular distance away may also be identified; for example, a profile may comprise a list of angular separations between displayed objects (such as an entry for every five or ten degrees of separation) and the action performed by the user. Optionally, such angular separation may be separated into horizontal and vertical components with entries for each, since user mobility and behaviour may be different for similarly sized horizontal and vertical angular separations. Similarly optionally, the letters/markers shown in FIG. 3 may be positioned or sequenced to cause at least some predominantly horizontal or predominantly vertical transitions of eye and/or head motion during calibration.

The actions performed may be recorded in any suitable manner; one example of a suitable method is that of a lookup table with three columns. A first column may relate to eye motion, a second to head motion, and a third to body/torso motion. Each of these may comprise a value indicative of the amount of motion performed—for example, an angular change to the viewpoint resulting from each component, or a percentage of the transition motion that is contributed by each component.

Alternatively, or in addition, a categorisation may be applied to each user that matches them to a reference profile that resembles their pattern of eye/head/body motion. In a most basic example, a user could be classed as a 'head-mover' if they move their head more frequently than some threshold amount or an 'eye-mover' if they do not. Any number of categories could be defined, so as to represent the spectrum of different users in a suitably accurate manner.

Of course, the order in which a user is instructed to view different markers may be varied. Different markers may also be provided for different users, and the number of markers used may be selected freely—indeed, the calibration process may be open-ended and continue generating markers until a suitably accurate profile is generated.

In some examples, the order, number, and location of markers may be varied in response to the calibration data as it is generated. For example, markers may be selected to alternately induce head motions and only-eye motions; by doing this, the boundary at which a user begins to use head motions in addition to eye motion may be identified more quickly in some cases.

Alternatively, or in addition, the order, number, and location of markers may be selected in dependence upon user information. For example, a user could provide information about their habits (or information could be gathered by performing tracking pre-calibration) to determine whether significant head motion is expected or not. Similarly, statistical data about a user (such as age, gender, or height) and/or their equipment usage (TV/HMD, distance from display, main applications/application type) may be used to identify an expected profile, and calibration may be performed to identify deviations from this expected profile. Such an expected profile may be derived from statistical data gathered through other calibrations, for example.

Calibrations may also be performed in different use cases, so as to generate a time- or user condition-based profile. For instance, as a user becomes more tired (either at night, on a work/school night, or after a long gaming session, for example) the amount of user head motion may be reduced significantly in favour of eye motion as this would be less energetic for the user. Alternatively, or in addition, changes due to these (or other) factors may be modelled and applied to a single or a small number of calibrations by a user.

The format of markers may be varied in order to provide a more detailed profile; for example, users may respond to different colours in different manners. A visually striking colour, such as a bright yellow or red, may induce a greater head motion than a less visually striking colour, such as a pale blue or green. This may be a result of certain colours either catching the user's attention more due to personal preference, or by being colours associated with particular emotions (such as fear or danger). Similarly, some shapes may have different effects on the user's actions and therefore markers having different shapes may be incorporated into a calibration process.

In some embodiments, the calibration process may incorporate a time-limited element. Generally, eye motion is faster than head motion and so it may be expected that some users may increase their reliance on eye motion over head motion when a faster viewing transition is required. This may be implemented in a number of ways—for example, a timer may be provided, or the user may be rewarded for performing the calibration process (or a portion of the process) within a particular time. Alternatively, or in addition, markers may be designed so as to encourage a faster head motion by using particular colours or shapes and/or the calibration may be provided in a context that causes a user to become more (or less) excited and therefore react more (or less) energetically.

Once a user profile has been generated, any future calibrations may be tailored so as to be more comfortable for that user. An example is in the case that an initial calibration is performed upon setup of the HMD (or other system), and an application-specific or refresher calibration is performed at a later date. A refresher calibration may be either to ensure that the user's profile has not changed since an earlier calibration, or to assist in calibrating a new eye-tracking arrangement, for example.

In such embodiments it may be possible to identify which areas users do not tend to view with eye motion only, and to reduce the number of markers presented in these areas for calibration purposes (in some cases, reduce the number to zero).

Figure 4:
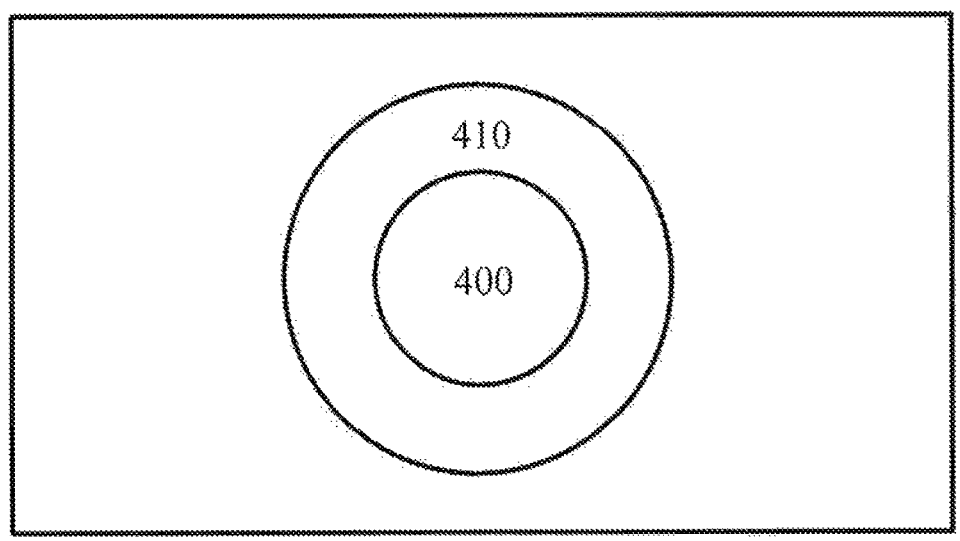
FIG. 4 schematically illustrates regions of a user's view.

For example, FIG. 4 shows a central region 400 in which a user is determined to be most comfortable using eye motion alone. This may be an area in which all motions by the user would be eye motion only, or at least an above-threshold percentage.

Surrounding the central region 400 is a secondary region 410 in which the user sometimes uses head motion instead of (or in addition to) eye motion, but would still be comfortable using eye motion alone.

Outside of the secondary region 410 it is taken that the user is not able to view content comfortably with eye motion alone.

Of course, users may be more comfortable moving their eyes and/or head in some directions than others; in such a case, it is not required that the regions 400 and 410 are circular and they may instead take any suitable shape.

In view of this, it is expected that most, or in some embodiments all, calibration markers are present in the regions 400 and 410. While a small number may be outside of the region 410, this number should be limited in view of the fact that it would cause discomfort for the user to view them without moving their head. The sizes of the regions 400 and 410 may be determined in dependence upon previous calibration information or a user's motion profile.

The user profile that is generated may also be used in other alternative/additional ways. In one example, a user's profile information is used to characterise their interactions with displayed content. For instance, 'anomalous' interactions (that is, those actions which deviate from the expected actions as suggested by the user profile) may be taken to be indicative of particular user interest in a displayed object or the like.

FIG. 5 schematically illustrates examples of two different methods for performing a viewing transition. FIG. 5 shows a user wearing an HMD, and the display that is associated with that HMD (although of course, these teachings could be applied to a more typical display screen arrangement such as a television). A viewing transition here means the action performed by a user to transfer their gaze from one part of a display to another. In the examples 510 and 520, the user 500 has moved their gaze and/or eye-in-head radius from the areas denoted by the solid lines to the areas denoted by the dashed lines. The smaller circle shows the focus position (equivalent to the region 400 of FIG. 4) while the larger circle shows the eye-in-head radius (equivalent to the region 410 of FIG. 4).

In the example 510, the user 500 performs the viewing transition by moving their head only, with the eye position remaining stationary with respect to the user's head. As noted above, this method of performing a transition is considered to be rare.

The example 520 shows the opposite method of performing the transition; the user 500 moves only their eyes, with the head position remaining stationary with respect to the display.

FIG. 6 schematically illustrates the middle-ground between these two examples 510 and 520. In the example 600, the user 500 moves their head a smaller distance than in the example 510 while also moving their eyes as in the example 520 (although to a lesser degree, due to the head motion).

Of course, the respective quantities of head and eye motion used to perform a particular viewing transition will vary from user to user. The information about the respective quantities of each motion for one or more transitions or transition types (such as large/small transitions) is stored in the user profile, as discussed above.

Figure 7:
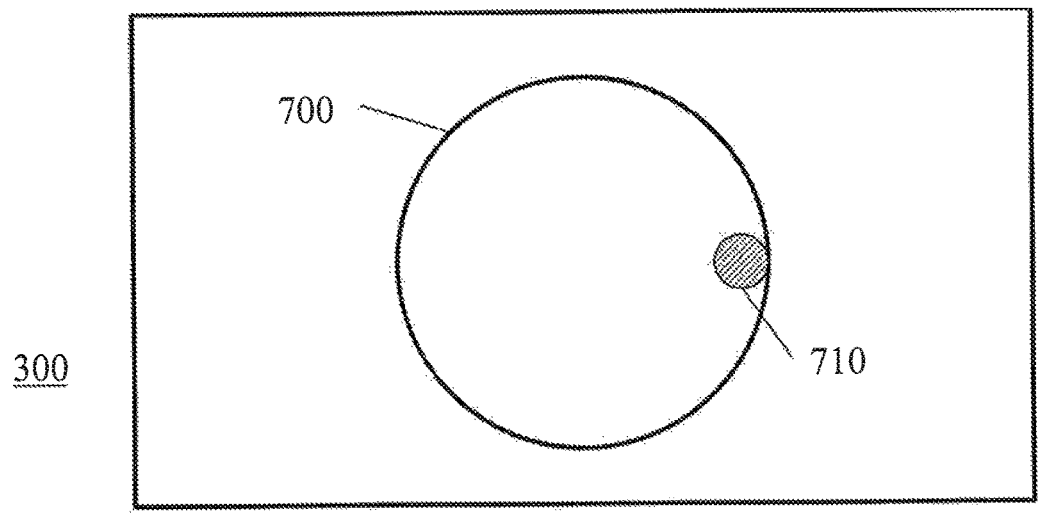
FIGS. 7-9 schematically illustrate gaze areas for different head/eye positions.
Figure 8:
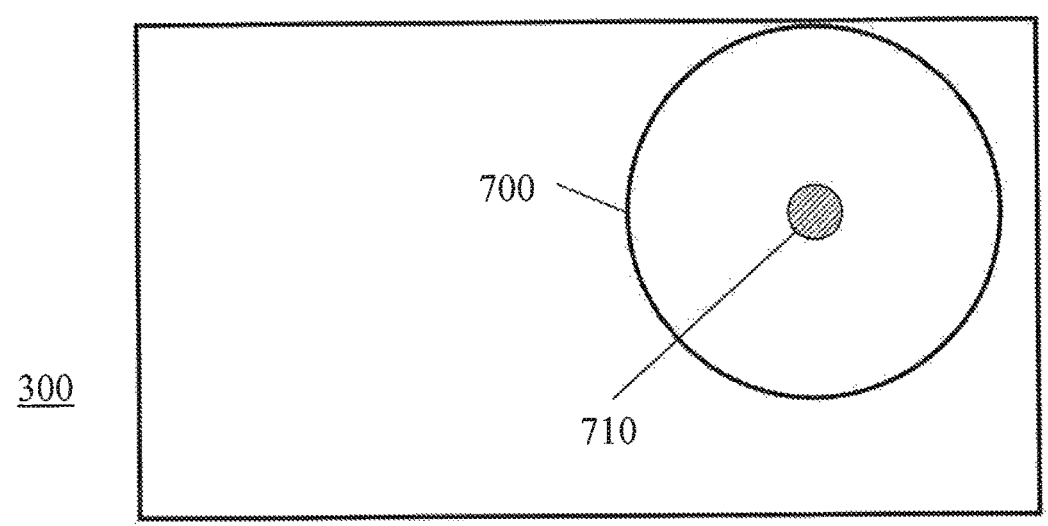
Figure 9:
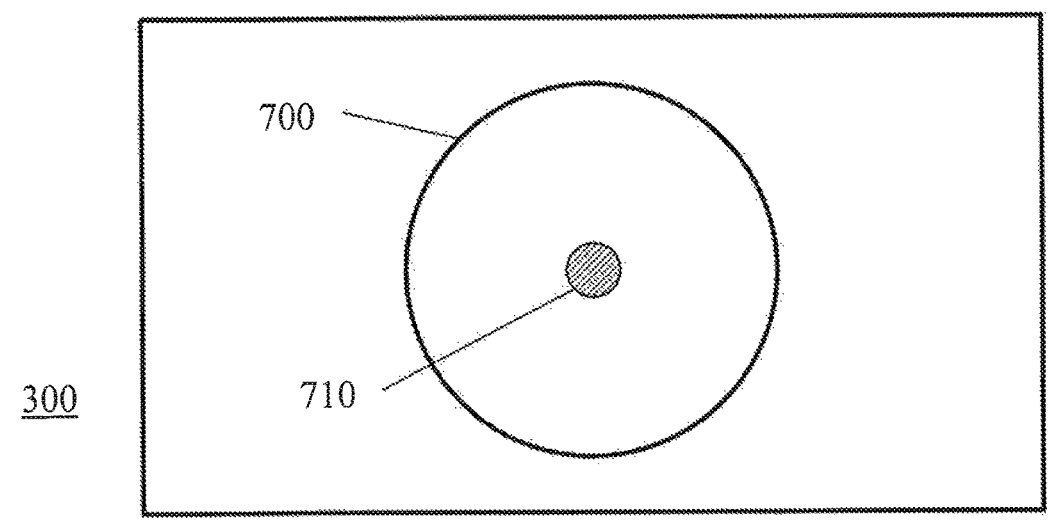

FIGS. 7-9 schematically illustrate combinations of head and eye motion that are referenced when discussing how a user's interaction with the displayed content. Here, the word 'interaction' may be taken as referring to interaction with a virtual element in interactive content (such as selection of a menu item in a game), viewing a particular area of a displayed image, or any other acknowledgement and/or use of the displayed content.

In each of these Figures, the circle 700 is taken to represent the total field of view of a user for a given head position, while the hatched circle 710 is taken to represent the users gaze position. The hatched circle 710 may be moved to any position within the circle 700, representing the range of eye motion available to a viewer. Of course, the respective sizes of the circles 700 and 710 may be determined on a per-user basis and information about these sizes may be stored in the user profile.

FIG. 7 shows an example in which the user has directed their head towards the centre of the display 300 (as signified by the position of the circle 700), whilst directing their gaze to the right-most edge of their field of view (as signified by the position of the circle 710 in relation to the position of the circle 700).

As noted above, this interaction with the displayed content may be characterised in dependence upon the user profile that has been established.

For example, if a user has been identified as one that does not move their head unless absolutely necessary (a user falling under the 'eye-mover' tag, for example) then such a situation is regarded as being potentially uncomfortable for the user. In view of this, the rendered content may be modified (in a similar fashion to that described with respect to the calibration described above, for example) so as to reduce the level of discomfort—this may take the form of making objects appear outside of the discomfort region (either nearer to the centre of the circle 700, or outside of the circle 700) such that the user is less likely to take such an uncomfortable gaze position.

Similarly, if the user is identified as one that frequently moves their head rather than relying exclusively on eye motion (a user falling under the 'head-mover' tag, for example) then such an uncharacteristic gaze position may be indicative of an exceptional circumstance. For example, it may be considered that the user is more tired than usual and so is moving their head less to conserve energy. In response to such a determination, the content displayed may be modified to be more appropriate for a tired viewer—such as lowering a difficulty of a game, or lowering the brightness or colour of a display (and/or volume levels of the content) under the assumption that the user will shortly be trying to sleep and may want a more relaxing experience.

Of course, the characterisations presented here are only exemplary and both the characterisation and the selected response (if any) may be determined freely. In some embodiments, one or both of these are determined based upon user input. Alternatively, or in addition, information may be gathered from user testing or other use data captured from a group of users.

FIG. 8 schematically illustrates a scenario in which the user has moved their head so as to more easily view the top right segment of the display 300 (as signified by the position of the circle 700), while the user's gaze remains central to the field of view (as signified by the relative position of the circle 710 within the circle 700. As in the scenario discussed with reference to FIG. 7, such an eye/head position combination may be interpreted differently in dependence upon the information contained in a user's profile.

For example, if a user has been identified as an eye-mover then such a motion would appear to be uncharacteristic—the expected motion for such a user would be that of moving the head only as far as necessary, and then moving the eyes to view the area 710 (such that the area 710 is towards the edge of the circle 700, rather than in the centre). The fact that the user has moved so uncharacteristically may be taken as an indication that the object in that area of the screen is of particular interest, or that the user is feeling on edge (while playing a horror game or watching a scary film, for example, and turning to have a full view rather than just moving their eyes). Of course, such characterisations are entirely exemplary and are provided only to show that a number of different characterisations are possible.

Of course, for a user that is identified as a head-mover such a motion is entirely in keeping with that expected from that user. This motion may therefore be ignored by the system, or simply taken as an indicator that the user is feeling comfortable and is behaving normally—should the user fail to perform such actions later in the session then it may be taken as a sign of fatigue. If a detection of fatigue is made due to a deviation in user interactions from the user profile, a warning may be displayed, a user may be encouraged to take a break, and/or the content may be modified (such as by making elements closer, or lowering the difficulty) as discussed above.

Turning to FIG. 9, this illustrates the view of a user that is focused on the centre of the screen 300—the area 710 occupies both the centre of the screen 300 and the centre of the circle 700.

While this may be taken as being indicative of attentiveness to whatever is displayed at the centre of the screen 300 in either case, it may be a greater indicator of interest for an eye-mover. This is because it would be expected that the user would have moved their head at other times during the viewing—and therefore by returning their head to a central position this may indicate a higher level of attention.

While the above examples are presented using a binary characterisation (that is, with a single characterisation corresponding to each of the 'head-mover' and 'eye-mover' tags), a more graduated response may be appropriate such that a greater number of characterisations is possible. The number of possible characterisations may be dependent on the interaction that is performed, or on the type of content that is displayed, in some embodiments. For example, when a movie is being displayed the number of potential characterisations may be low but when a user is playing a game the number of potential characterisations may be high due to the increased level of interaction that is expected.

As has been discussed, the generated user profile information and characterisations of interactions in dependence upon the information in the user profile may be used either as an input to modify content, or as feedback during a design process. For instance, user profiles could be generated for use during playtesting (or an equivalent process, such as during advance screenings of video content), and characterisations used to influence the design process.

FIG. 10 schematically illustrates a user profile generating system 1000 for generating a user profile for use with a processing device operable to display content. The system 1000 optionally comprises one or more cameras 1010, a head motion tracking unit 1020, an eye motion tracking unit 1030 and a profile generating unit 1040.

The one or more cameras 1010 are optionally operable to capture images of a user; examples of suitable devices include any visible light or IR cameras that capture images that may be used to identify motion of a user and/or the user's eyes. In some embodiments, cameras are used to detect both head and eye motion of a user, while in others specialised cameras (or other tracking devices) may be used to determine each motion. For example, imaging devices may be present in an HMD that are used to track eye motion. Alternatively or in addition, head motion may be determined from accelerometers or the like on a head mounted display. Similarly, one or more cameras may be mounted on the head mounted display to track apparent motion of the environment, thereby determining head motion, rather than capturing an image of the user themselves. Meanwhile, motion tracking of one or both of the user's eyes may be achieved by one or two cameras observing a respective eye, or other tracking methods known in the art.

The head motion tracking unit 1020 is operable to identify head motion of the user, for example from images of the user captured by the one or more cameras 1010. This may be achieved using any suitable motion tracking method. In some embodiments, the user may wear one or more markers that are used to simplify camera-based tracking methods. Alternatively, or in addition, the head motion tracking unit 1020 may use motion sensor data (such as from an accelerometer mounted upon an HMD worn by a user)—it is not essential that captured images are used to detect user head motion. It is therefore apparent that the head motion tracking unit is operable to identify head motion in dependence upon motion sensor data and/or camera data.

The eye motion tracking unit 1030 is operable to identify eye motion of the user; this may be performed using images captured by the one or more cameras 1010. Each eye may be tracked individually, or a single eye may be tracked and models used to predict a point of focus in dependence upon this, for example. Of course, some embodiments may not make use of cameras for performing eye tracking—in such cases, the eye motion tracking unit 1530 may instead perform processing to infer or predict a gaze direction.

For example, information may be gathered during the calibration process (or indeed, at any other time) that correlates head motion with the viewing of a particular area of the screen—the difference between the head orientation and the direction of the target may be taken to be indicative of an eye position of the user. A model may be generated, for example, that may be used to generate a predicted gaze direction based upon a measured head motion, and therefore a detection of the actual position of a user's eyes using image-based detection methods may be rendered unnecessary.

Other examples of methods that would not rely on explicit imaging of a user's eyes would include predictive methods, such as those based upon a user's past actions or known preferences. For example, if it is known that a user only likes to play a game for an hour, then any head motion towards a 'quit' option at this time may be taken to be indicative of the user's desire to quit the game. Similar methods may use information about which elements a user would typically view in a displayed image, with information either being provided by the user or being captured in a calibration process or the like.

The profile generating unit 1040 is operable to generate a user profile comprising head motion and eye motion information for the user. This motion information may be generated over any suitable period of time—for example, over a short calibration period, or over the whole of the user's experience with the system such that the profile is updated constantly. The generated user profile is used to modify interactions between the user and a processing device; as discussed above, this may be performed by modifying content in response to a calibration process using the profile information, or by modifying content in response to a characterisation of user interactions as compared to the user profile information.

As described above, a user profile identifies user preferences for eye motion and head motion. In some embodiments the user profile identifies proportions of head motion and eye motion used by a user in performing one or more viewing transitions between displayed content elements, and may also (or instead) identify a user as belonging to one or more categories in dependence upon their preferences for eye motion and head motion.

Interactions, as referred to above, may be any one or more of the list comprising viewing content, gaze-based inputs, gesture inputs, spoken inputs, and control device inputs. For example, a viewer that observes content is considered to be interacting with the content, as is a user who provides an input based upon their gaze direction, a hand or arm gesture, a voice command or a button press on a game controller. Of course, in some embodiments it is considered that a gaze direction may be combined with one or more of the other inputs to determine an interaction that is to take place.

FIG. 11 schematically illustrates a calibration system. This system comprises the user profile generating system 1000, a calibration unit 1100, and a calibration modification unit 1110. Of course, these elements need not be located at the same device; the user profile generating system 1000 may be located at a separate device, and only the user profile is used in its place.

The calibration unit 1100 is operable to perform a calibration process for an application or device associated with the processing device; for example, the calibration process may be used with a new display device, or a new application or the like. Of course, recalibrations are also considered in embodiments of the present arrangement.

The calibration modification unit 1110 is operable to modify the calibration process for a user in dependence upon information in their generated user profile. For example, in some embodiments the calibration modification unit is operable to modify the location of viewing targets within content displayed during the calibration process, as has been discussed above. More specifically, in some embodiments one or more of the displayed elements are moved closer to the centre of the displayed content.

In some embodiments, updates are made to the calibration process as it is being executed, such that information obtained at the start of the calibration process may be used to modify later parts of that same calibration. Alternatively, or in addition, future calibrations (for the same application/hardware, or others) may be modified in dependence upon information obtained during a first calibration.

FIG. 12 schematically illustrates an interaction characterisation system. This system comprises the user profile generating system 1000, a display content identification unit 1200, an interaction identification unit 1210, and an interaction characterisation unit 1220.

The display content identification unit 1200 is operable to identify one or more displayed elements in displayed content; for example, these may be particular objects or characters in a video or game. For example, objects or characters may be identified from image processing (such as shape recognition), or could be identified by reading tags associated with each object or character (such as metadata that lists the objects and/or characters appearing in an image).

The identification interaction unit 1210 is operable to identify an interaction with one or more of the displayed elements.

The interaction characterisation unit 1220 is operable to characterise an identified interaction in dependence upon information in the user profile. As discussed above, this may be performed by comparing an interaction with the expected interaction based upon the information in a user profile. In some embodiments, the interaction characterisation unit is operable to identify user interest in displayed elements based upon the characterisation; alternatively, or in addition, the interaction characterisation unit may also be operable to identify a level of user tiredness based upon the characterisation.

In some embodiments, the units described in FIGS. 10-12 are each provided in a single unit; alternatively, they may be distributed in any suitable configuration that enables the functions to be performed.

It will also be appreciated that an entertainment device, running an application such as a game, with user interface features that require selective attention of the user, may modify the layout of the user interface features in response to user profiles such as those described herein.

For example, the separation between user displayed interface features may be reduced responsive to the current user's threshold for head motion (either as a single angular separation value, or based on separate horizontal and vertical values), making selections though gaze tracking or simply assimilation of the UI features more comfortable for the user by reducing the need for head motion.

This may take the form of keeping the angular separation between individual UI features within the threshold(s) or keeping all of a predetermined set of UI features within the threshold(s), depending on the UI implementation.

The separation may optionally be subject to a minimum separation threshold dependent upon the discriminatory capabilities of a gaze tracking system, or other factors such as space needed for animations of or around UI features to occur without clashes between neighbouring elements.

Alternatively, where a user's threshold for head motion is very low (i.e. they tend to use head motion by preference) and so the required separation of UI features would be too small to allow clear presentation without head motion, further use of the profile data could be made to determine when the user started also moving their eyes as well as their head, as this may be indicative of when head motion becomes less comfortably/natural. This extended angular separation value may be used as a revised threshold for spacing individual UI features or clustering predetermined set of UI features.

Figure 13:
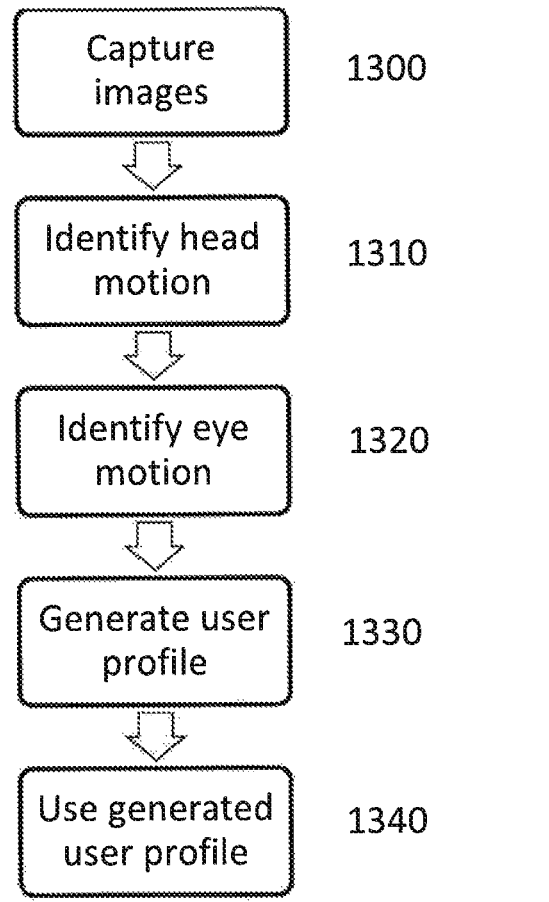
FIG. 13 schematically illustrates a user profile generating method.

FIG. 13 schematically illustrates a user profile generating method for generating a user profile for use with a processing device operable to display content.

A step 1300 comprises optionally capturing images of a user; this step 1100 may further comprise gathering data from inertial sensors or the like that may also be used to identify motion of the user.

A step 1310 comprises identifying head motion of the user.

A step 1320 comprises identifying eye motion from images of the user.

A step 1330 comprises generating a user profile comprising information about head motion and eye motion for the user.

A step 1340 comprises using the generated user profile to modify interactions between the user and a processing device.

Figure 14:
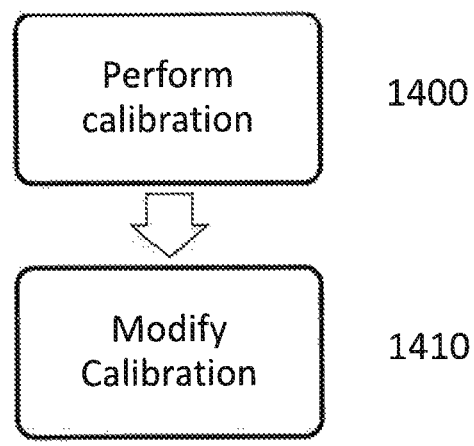
FIG. 14 schematically illustrates a calibration method.

FIG. 14 schematically illustrates a calibration method.

A step 1400 comprises performing the calibration process for an application or device associated with the processing device.

A step 1410 comprises modifying the calibration process for a user in dependence upon information in their generated user profile.

Figure 15:
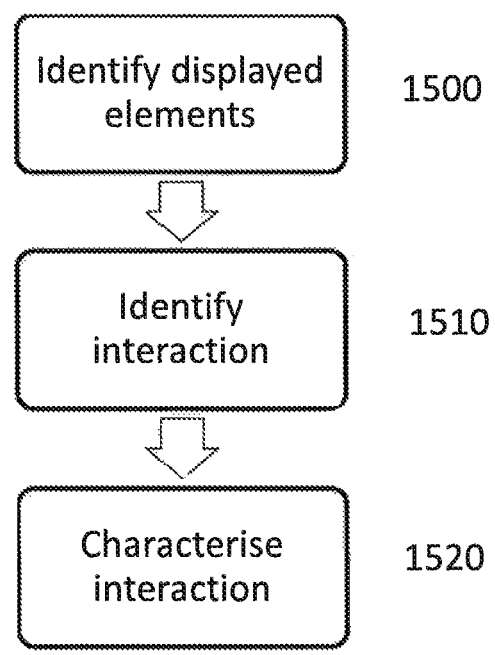
FIG. 15 schematically illustrates an interaction characterisation method.

FIG. 15 schematically illustrates an interaction characterisation method.

A step 1500 comprises identifying one or more displayed elements in displayed content.

A step 1510 comprises identifying an interaction with one or more of the displayed elements.

A step 1520 comprises characterising an identified interaction in dependence upon information in the user profile.

The methods that are exemplified in FIGS. 13-15 may be combined freely, so as to include different combinations of methods. For example, a process may comprise all three methods—such that a user profile is generated, a calibration process is modified in dependence upon this and then user interactions are characterised based upon this same profile.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A user profile generating system for generating a user profile for use with a processing device operable to display content, the system comprising:
   a head motion tracking unit operable to identify head motion of the user;
   an eye motion tracking unit operable to identify eye motion of the user;
   a profile generating unit operable to generate a user profile comprising head motion and eye motion information for the user;
   a display content identification unit operable to identify a particular one or more displayed elements among a plurality of displayed elements within displayed content;
   an identification interaction unit operable to identify an interaction with the particular one or more of the plurality of displayed elements within the displayed content; and
   an interaction characterisation unit operable to characterize the identified interaction in dependence upon the head motion and eye motion information in the user profile, wherein:
   the user profile identifies user preferences for eye motion and head motion, and
   the user profile identifies proportions of head motion and eye motion used by a user in performing one or more viewing transitions between displayed content elements.

2. A system according to claim 1, comprising:
   a calibration unit operable to perform a calibration process for an application or device associated with the processing device; and
   a calibration modification unit operable to modify the calibration process for a user in dependence upon information in their generated user profile.

3. A system according to claim 2, wherein the calibration modification unit is operable to modify the location of viewing targets within content displayed during the calibration process.

4. A system according to claim 3, wherein one or more of the displayed elements are moved closer to the centre of the displayed content.

5. A system according to claim 1, wherein the generated user profile is used to modify interactions between the user and a processing device.

6. A system according to claim 1, wherein the interaction characterisation unit is operable to identify user interest in displayed elements based upon the characterisation.

7. A system according to claim 1, wherein the interaction characterisation unit is operable to identify a level of user tiredness based upon the characterisation.

8. A system according to claim 1, wherein interactions are one or more of the list comprising viewing content, gaze-based inputs, gesture inputs, spoken inputs, and control device inputs.

9. A system according to claim 1, wherein the head motion tracking unit is operable to identify head motion in dependence upon motion sensor data and/or camera data.

10. A system according to claim 1, wherein the user profile identifies a user as belonging to one or more categories in dependence upon their preferences for eye motion and head motion.

11. A user profile generating method for generating a user profile for use with a processing device operable to display content, the method comprising identifying head motion of the user;
 identifying eye motion of the user;
 generating a user profile comprising head motion and eye motion information for the user;
 identifying a particular one or more displayed elements among a plurality of displayed elements within displayed content;
 identifying an interaction with the particular one or more of the plurality of displayed elements within the displayed content; and
 characterizing the identified interaction in dependence upon the head motion and eye motion information in the user profile, wherein:
 the user profile identifies user preferences for eye motion and head motion, and
 the user profile identifies proportions of head motion and eye motion used by a user in performing one or more viewing transitions between displayed content elements.

12. A non-transitory machine-readable storage medium which stores computer software, which when executed by a computer system, causes the computer system to perform user profile generating method for generating a user profile for use with a processing device operable to display content, by carrying out actions, comprising:
 identifying head motion of the user;
 identifying eye motion of the user;
 generating a user profile comprising head motion and eye motion information for the user;
 identifying a particular one or more displayed elements among a plurality of displayed elements within displayed content;
 identifying an interaction with the particular one or more of the plurality of displayed elements within the displayed content; and
 characterizing the identified interaction in dependence upon the head motion and eye motion information in the user profile, wherein:
 the user profile identifies user preferences for eye motion and head motion, and
 the user profile identifies proportions of head motion and eye motion used by a user in performing one or more viewing transitions between displayed content elements.

* * * * *